United States Patent [19]

Hillestad

[11] 4,449,871
[45] May 22, 1984

[54] PORTABLE TUBE MILLING TOOL

[76] Inventor: Tollief O. Hillestad, H & S Tool Inc., 212 W. Bergey St., Wadsworth, Ohio 44281

[21] Appl. No.: 213,814

[22] Filed: Dec. 8, 1980

[51] Int. Cl.³ .............................................. B23C 3/00
[52] U.S. Cl. .................................... 409/178; 82/4 C; 408/136; 408/137
[58] Field of Search ................. 279/2 R, 47; 409/178, 409/138, 183, 185, 189, 192, 197, 201, 205, 65; 408/104, 102, 106, 79, 80; 82/4 C

[56] References Cited
U.S. PATENT DOCUMENTS

| | | | |
|---|---|---|---|
| 3,051,059 | 8/1962 | Davey | 409/178 |
| 3,228,268 | 1/1966 | Strout | 408/104 |
| 3,875,832 | 4/1975 | Mayfield | 82/4 C |
| 3,999,452 | 12/1976 | Larsen | 82/4 C |
| 4,257,289 | 3/1981 | Groothius | 82/4 C |

Primary Examiner—Robert E. Garrett
Assistant Examiner—Thomas M. Kline
Attorney, Agent, or Firm—Oldham, Oldham, Hudak, Weber & Sand Co.

[57] ABSTRACT

This tool is for performing precise machine operations on boiler tube ends, while the tubes are in place in the boiler, and it consists primarily of a hand-held housing, including therein a main gear and pinion gear, designed specifically for strength and long life, the combination serving to rotate a cutting tool holder, having a multiple number of cutting blades. It further includes a self-contained air motor, for driving the cutting tool holder, so as to mill the outside diameters of the boiler tubes, and the tool also includes a collet and rod secured to its center shaft, for locking the tool in a boiler tube.

7 Claims, 4 Drawing Figures

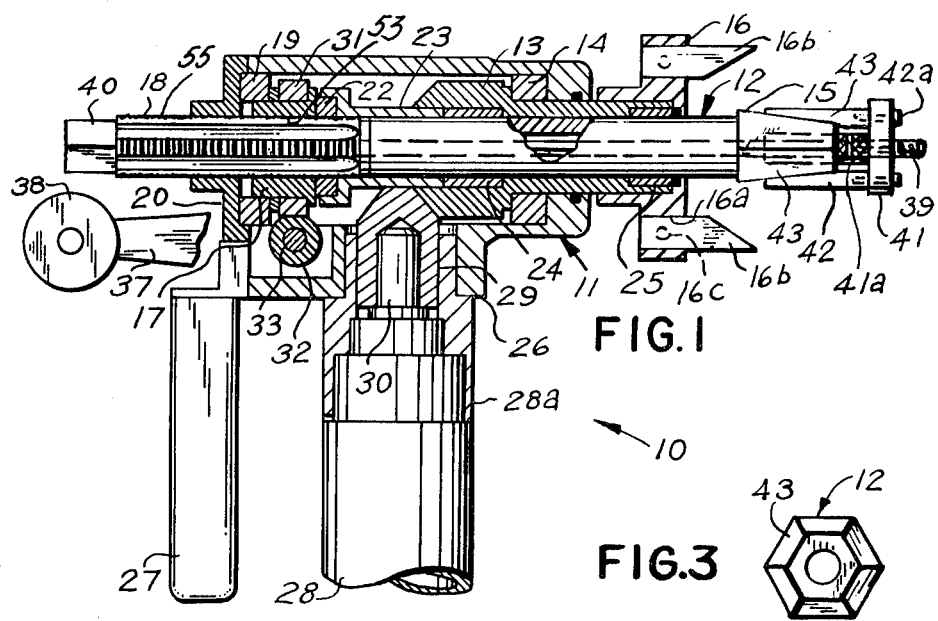
FIG.1
FIG.3
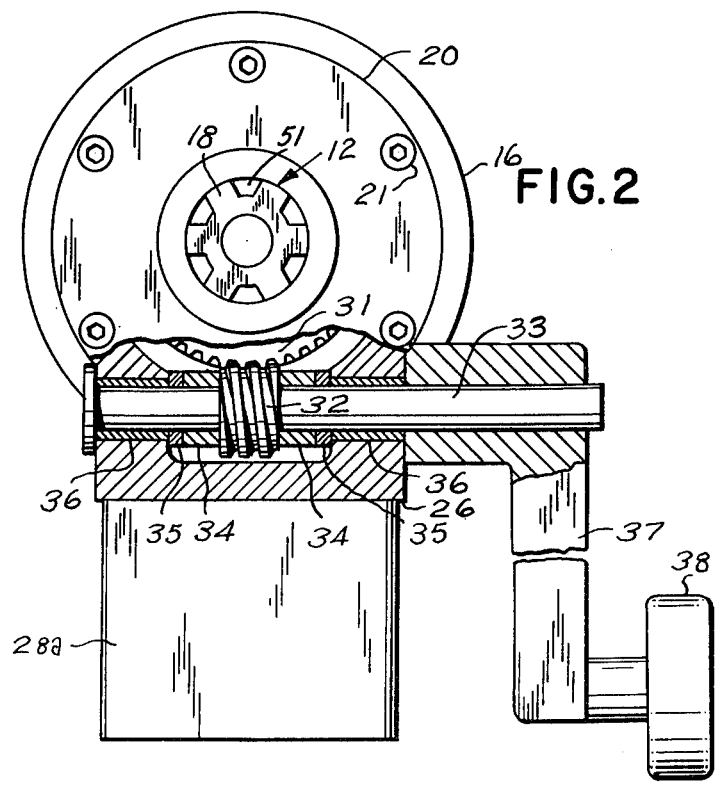
FIG.2

PORTABLE TUBE MILLING TOOL

This invention relates to portable power tools, and more particularly, to a portable tube milling tool.

It is, therefore, the principal object of this invention to provide a portable tube milling tool, which will be operated to perform precise machine operations on boiler tube ends, while the tubes are in place within the boiler.

Another object of this invention is to provide a portable tube milling tool, which will be locked into a boiler tube, by means of a collet and rod combination device, the collet being expanded on the interior of the boiler tube, automatically centering it along with the splined center shaft of the tool, thus eliminating any torque transfer onto the operator, and the aforementioned also causes the tool to be securely locked in the boiler tube, for safety reasons.

Another object of this invention is to provide a portable tube milling tool, which will have a self-contained air motor for driving it, and the tool will be of such structure, that it will not be susceptible to breakdown or malfunction in the field.

A further object of this invention is to provide a portable tube milling tool, which will machine tube ends, from three-quarters of an inch inside diameter, to three and three-quarters of an inch inside diameter.

Other objects of the present invention are to provide a portable tube milling tool, which is simple in design, inexpensive to manufacture, rugged in construction, easy to use and efficient in operation.

These, and other objects, will be readily evident, upon a study of the following specification, and the accompanying drawing, wherein:

FIG. 1 is a fragmentary side elevational view of the present invention, shown partly broken away;

FIG. 2 is an enlarged fragmentary left end view of FIG. 1, shown in elevation, and FIG. 3 is an enlarged right end view of the center shaft of FIG. 1, shown in elevation, with the collet and rod combination removed therefrom, for the sake of clarity.

Figure 3A:
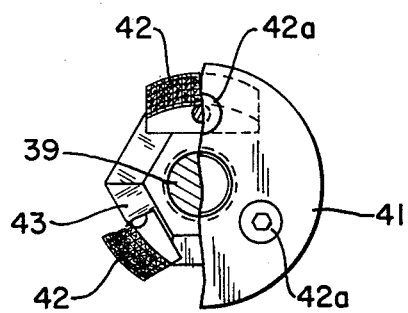
FIG. 3A is an end view, partially broken away to show the arrangement of the collet members.

According to this invention, a tool 10 is shown to include a housing 11, having, on its interior, a center shaft 12 positioned on its longitudinal axis. Shaft 12 is freely received in drive gear 13, and drive gear 13 is journalled in bearing 14, in the forward end of housing 11. Center shaft 12 is hollow, and includes a tapered hexagonal head 15, which extends forward of a tool holder 16, that is fixedly secured to gear 13, in a suitable manner (not shown). Shaft 12 provides a means of centering tool 10 with the longitudinal axis of a boiler tube (not shown), and tool holder 16 includes a plurality of broached, square openings 16a, which are equally and radially spaced apart, so as to receive cutting blades 16b, that are secured in holder 16 by setscrew 16c means. A feed nut 17 is received on the splined and threaded end 18 of center shaft 12, and is supported in bearing 19, in the end of housing 11, which is capped by a closure cap 20, secured to housing 11, by a plurality of suitable fasteners 21. The splines on the shaft end engage end cap projections 51 thereby preventing tool 10 from rotating upon operation thereof. A support bearing 22 is received on the splined end 18 of center shaft 12, within a spacer sleeve 23, and a bearing 24 is received within drive gear 13 at one end, for supporting gear 13 on center shaft 12. A bearing 25 is also received in the opposite end of drive gear 13, for supporting gear 13 on shaft 12.

To the bottom 26, which is integral with housing 11, is a handle grip 27, secured thereto in a suitable manner, for the operator to hold tool 10, and an air driven motor 28 is suitably secured to housing 11 by an adapter 28a, in a manner not shown. A pinion gear 29 is suitably secured to the shaft 30 of motor 28, and pinion gear 29 engages with drive gear 13, so as to rotate it and its attached tool holder 16.

A gear 31, on the outer periphery of feed nut 17, engages with worm gear 32, fixedly secured to crank shaft 33, mounted in the bottom 26 of housing 11. A pair of bearings 34, between a pair of spacers 35, and a pair of end bearings 36, mounted in the bottom 26 of housing 11, provide common support means for the crank shaft 33. Crank shaft 33 is fixedly secured, in a suitable manner (not shown), within crank handle 37, which includes a rotatable knob 38.

A rod 39, threaded at one end, and having a head 40 at its opposite end, is received within the hollow shaft 12. The head 40 abuts with splined end 18 of shaft 12, and the threaded end is threadingly received in the center of collet 41, which includes a knurled shank 41a, received in the end of head 15 of shaft 12. A plurality of split jaws 42 are secured to collet 41, by suitable fasteners 42a, and jaws 42 grippingly engage the faces 43 of the tapered hexagonal head 15 as rod 39, having threads thereon, is rotated, as by head 40. The collet 41 and rod 39 combination serves as a means of locking tool 10 in the boiler tube that is to be machined.

In use, tool 10 is locked into the end of a boiler tube by means of the collet 41, which, by expanding on the inside of the tube, will automatically center it, when motor 28 is turned on, and, through the crank handle 37, shaft 33, the gears 31 and 32, a slow feed rotation of tool holder 16 is attained. Motor 28, through gear 29, rotates drive gear 13, which rotates tool holder 16 to machine a boiler tube, and the crank handle 37 rotates the feed nut 17 having projections 53 thereon which matingly engages the periphery of shaft 12 having teeth 55 thereon, to advance or retract shaft 12 in housing 11, thus urging tool holder 16 forward or backward, in controlling the cutting operation.

While various changes may be made in the detail construction, it is understood that such changes will be within the spirit and scope of the present invention, as is defined by the appended claims.

What I now claim is:

1. A portable tube milling machine, comprising:
   in combination, a housing, a hollow shaft received in said housing, a collet removably received on said hollow shaft for locking and centering said hollow shaft in a boiler tube that is to be machined, while in a boiler, a drive gear freely rotatably received on said hollow shaft and in engagement with a gear secured to a motor secured to said housing, a hand crank with gear means secured to said housing for controlling the rate of feed of a cutting tool holder, said holder being secured to, and driven by, said drive gear, and a feed nut matingly engaging the periphery of said hollow shaft for advancing said hollow shaft in said housing and in said drive gear, by means of said hand crank, said hollow shaft having splines on one end thereof, a housing closure cap having projections thereon, said projections engaging said splines.

2. The combination according to claim 1, wherein said hollow shaft is disposed along the longitudinal axis of said housing, the rear portion being splined and threaded, and the forward portion including a tapered hexagonal head, which removably and slidably receives a plurality of jaws secured to the face of said collet, for expanding on the inside of said tube, to center said machine on the longitudinal axis of said tube, and said collet is threadingly received on a rod freely received in the bore of said hollow shaft, the opposite end including a head, which abuts with the extending splined end of said hollow shaft, and said cutting tool holder is circular in configuration, and fixedly secured to said drive gear by suitable means, and includes a plurality of equally and radially spaced apart cutting blades, which are received in openings through its flange, for machining the end of said tube, and said feed nut is internally threaded, and received on said splined end of said hollow shaft, for being rotated by said gear means, which comprises a worm gear fixedly secured to said hand crank, said feed nut, when rotated by said worm gear, providing the means to advance or return said hollow shaft, to enable said cutting tool holder and said housing to move forward or rearwardly.

3. A portable milling tool, comprising:
a housing, said housing having a shaft extending therethrough, one end of said shaft being tapered, the other end of said shaft having at least a spline thereon, a feed nut engaging said spline,
said housing having an end cap, said end cap having at least a projection thereon engaging said shaft spline,
a collet means for securing a work piece, said collet means residing upon said tapered shaft, and
a crank having a worm gear, said worm gear engaging said feed nut so that movement of said crank causes said shaft to move forward or backward.

4. A portable milling tool according to claim 3, including a rod, said shaft being hollow, said rod extending through said hollow shaft, said collet means attached to one end of said rod and having expandable jaws, the remaining end of said rod having a knob thereon, whereby movement of said rod knob causes said jaws to move along said tapered shaft and either expand or contract.

5. A portable milling tool according to claim 4, wherein said collet has a plurality of jaws, wherein said taper shaft has a plurality of surfaces, and wherein said jaws reside upon said surfaces.

6. A portable milling tool according to claim 5, including a drive gear and a milling head, said milling head connected to said drive gear, a pinion gear, said pinion gear connected to said drive gear.

7. A portable milling tool according to claim 6, including a pneumatic motor, said pneumatic motor having a pinion gear which engages said drive gear.

* * * * *